(12) United States Patent
Fu et al.

(10) Patent No.: US 7,990,657 B2
(45) Date of Patent: Aug. 2, 2011

(54) PLURALITY OF NON-MAGNETIC DAMPERS ON A VOICE COIL YOKE ARM

(75) Inventors: Ta-Chang Fu, San Jose, CA (US); Jeffrey Kerner, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 772 days.

(21) Appl. No.: 11/818,182

(22) Filed: Jun. 12, 2007

(65) Prior Publication Data

US 2008/0310054 A1  Dec. 18, 2008

(51) Int. Cl.
*G11B 5/55* (2006.01)
(52) U.S. Cl. .................................................. 360/264.7
(58) Field of Classification Search ............... 360/264.7
See application file for complete search history.

(56) References Cited

U.S. PATENT DOCUMENTS

| | | | |
|---|---|---|---|
| 5,999,374 A | 12/1999 | Kim | |
| 6,151,198 A | 11/2000 | Prater et al. | |
| 6,549,381 B1 | 4/2003 | Watson | |
| 6,583,964 B1 | 6/2003 | Huang et al. | |
| 6,731,466 B2 | 5/2004 | Arya | |
| 6,879,466 B1 * | 4/2005 | Oveyssi et al. | 360/265.7 |
| 6,952,323 B2 | 10/2005 | Hirasaka et al. | |
| 2004/0095682 A1 | 5/2004 | Dominguez et al. | |

FOREIGN PATENT DOCUMENTS

WO  WO-9828243  7/1998

* cited by examiner

Primary Examiner — David D Davis

(57) ABSTRACT

A plurality of non-magnetic dampers on a voice coil yoke arm for reducing low frequency vibration in a hard disk drive is disclosed. One embodiment provides housing and at least one disk coupled with the housing. In addition, an actuator is coupled to the housing, the actuator having a coil region with a voice coil and a plurality of voice coil yoke arms. At least one of a plurality of non-magnetic dampers is also coupled with each of the plurality of voice coil yoke arms and not with the voice coil. In so doing, the plurality of non-magnetic dampers are able to damp low frequency actuator coil torsion and coil bending resonances.

15 Claims, 5 Drawing Sheets

225

350

400

RECEIVES AN ACTUATOR COMPRISING A COIL REGION HAVING A VOICE COIL AND A PLURALITY OF VOICE COIL YOKE ARMS COUPLED WITH THE VOICE COIL; AND A SUSPENSION FOR REACHING OVER THE DISK, THE SUSPENSION HAVING A SLIDER COUPLED THEREWITH, THE SLIDER HAVING A READ/WRITE HEAD ELEMENT ON A TRAILING EDGE (TE) PORTION.
402

COUPLES AT LEAST ONE OF A PLURALITY OF THE NON-MAGNETIC DAMPERS WITH EACH OF THE PLURALITY OF VOICE COIL YOKE ARMS AND NOT WITH THE VOICE COIL, THE PLURALITY OF NON-MAGNETIC DAMPERS UTILIZED FOR DAMPING LOW FREQUENCY VIBRATIONS OF THE ACTUATOR.
404

FIG. 4

PLURALITY OF NON-MAGNETIC DAMPERS ON A VOICE COIL YOKE ARM

TECHNICAL FIELD

The present invention relates to the field of hard disk drive development, and more particularly to a method and system for utilizing a plurality of non-magnetic dampers on a voice coil yoke arm to reduce low frequency vibration in a hard disk drive.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Generally, the small drives have small components with very narrow tolerances. For example, disk drive sliders are designed to fly in very close proximity to the disk surface. For instance, in some systems the slider may be designed to fly only three to five nanometers above the disk surface. Due to the tight tolerances, any vibration activity that is realized anywhere on the entire actuator arm, can deleteriously affect the performance of the HDD. For example, vibration of the actuator can result in variations in the magnetic spacing between the head element and media.

For example, as disk drive track per inch (TPI) increases, sensitivity to small vibrations also increases. That is, small vibrations can cause large off-track and hence degraded performances. Due to the TPI increase, it is more and more difficult to meet the actuator vibration requirements by controlling only voice coil motor (VCM)/actuator coil centerline tolerances, while still maintaining light structure for fast-move-time performance requirement.

In many cases, the variations in the magnetic spacing between the head element and media, the off-track issues and the increase in TPI are likely to cause data errors—both hard errors during writing and soft errors during reading. Moreover, vibration induced errors become even more apparent as the actual offset distances and overall components are reduced in size.

SUMMARY

A plurality of non-magnetic dampers on a voice coil yoke arm for reducing low frequency vibration in a hard disk drive is disclosed. One embodiment provides a housing and at least one disk coupled with the housing. In addition, an actuator is coupled to the housing, the actuator having a coil region with a voice coil and a plurality of voice coil yoke arms. At least one of a plurality of non-magnetic dampers is also coupled with each of the plurality of voice coil yoke arms and not with the voice coil. In so doing, the plurality of non-magnetic dampers are able to damp low frequency vibration of the actuator, such as vibration caused by voice coil and voice coil yoke arm vibrations.

BRIEF DESCRIPTION OF THE DRAWINGS

FIG. 4 is a flowchart of a method for utilizing non-magnetic dampers on a voice coil yoke arm to reduce low frequency vibration in accordance with one embodiment of the present invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system providing non-magnetic dampers on a voice coil yoke arm for reducing low frequency vibration in a hard disk drive, such as, low frequency vibration caused by voice coil and voice coil yoke arm vibrations in particular.

Overview

In general, embodiments of the present invention provide a method and apparatus providing non-magnetic dampers on a voice coil yoke arm for reducing low frequency vibration in a hard disk drive. For example, as disk drive track per inch (TPI) increases, sensitivity to small vibrations also increases. That is, small vibrations can cause large off-track and hence degraded performances. Due to the TPI increase, it is more and more difficult to meet the actuator vibration requirements by controlling only voice coil motor (VCM)/actuator coil centerline tolerances, while still maintaining light structure for fast-move-time performance requirement.

However, by utilizing the non-magnetic voice coil yoke arm dampers described herein, low frequency actuator coil torsion and coil bending resonances at seek/settle are significantly reduced. In addition, because the voice coil yoke arm dampers are non-magnetic, they will not affect the VCM magnetic field. Moreover, this reduction in low frequency actuator coil torsion and coil bending resonances is realized with minimal modification to the overall HDD manufacturing process and to the actuator structure.

Operation

Figure 1A:
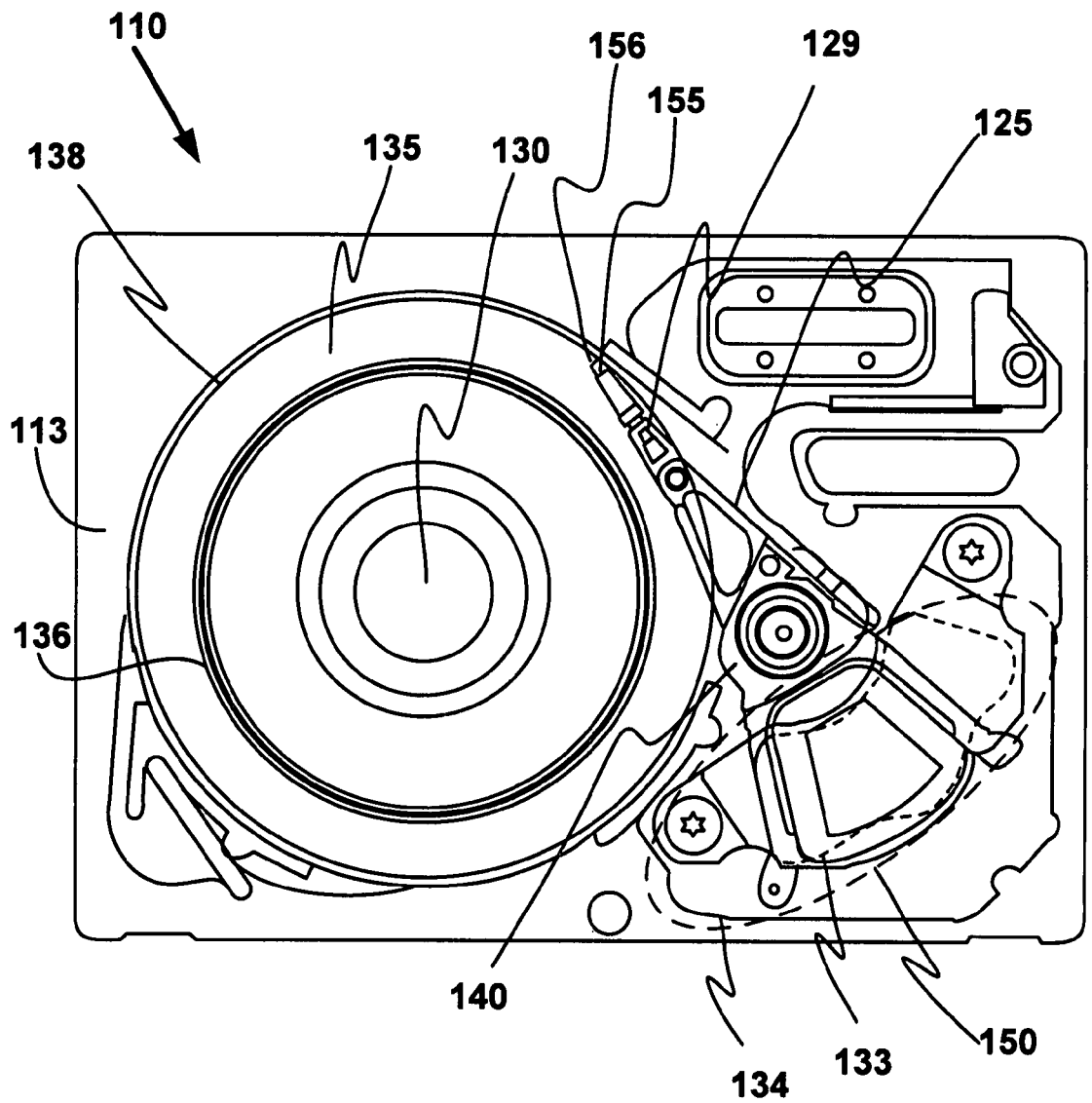
FIG. 1A is a plan view of an HDD with cover and top magnet removed in accordance with one embodiment of the present invention.

With reference now to FIG. 1A, a schematic drawing of one embodiment of an information storage system comprising a magnetic hard disk file or drive 110 for a computer system is shown. Hard disk drive 110 has an outer housing or base 113 containing a disk pack having at least one media or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the radial direction relative to housing 113. An actuator 120 comprises a plurality of parallel actuator arms 155 in the form of a comb that is movably or pivotally mounted to base/housing 113 about a pivot assembly 140. A controller 150 is also mounted to base 113 for selectively moving the comb of arms relative to the disk pack (as represented by disk 138).

In the embodiment shown in FIG. 1A, each arm 125 has extending from it at least one cantilevered integrated lead suspension (ILS) 129. The ILS 129 may be any form of lead suspension that can be used in a data access storage device, such as a hard disk drive (HDD). The slider 155 is usually bonded to the end of ILS 129. The level of integration containing the slider, suspension, ILS, and read/write head (not shown) is called the Head Gimbal Assembly (HGA).

The ILS 129 has a spring-like quality, which biases or presses the air-bearing surface of slider 155 against disk 138 to cause slider 155 to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 150 by controller 140 causes the head gimbal assemblies to move along radial arcs across tracks on the surface 135 of disk. The head gimbal assemblies operate in a conventional manner and always move in unison with one another, unless drive 110 uses multiple independent actuators (not shown) wherein the arms can move independently of one another.

Figure 1B:
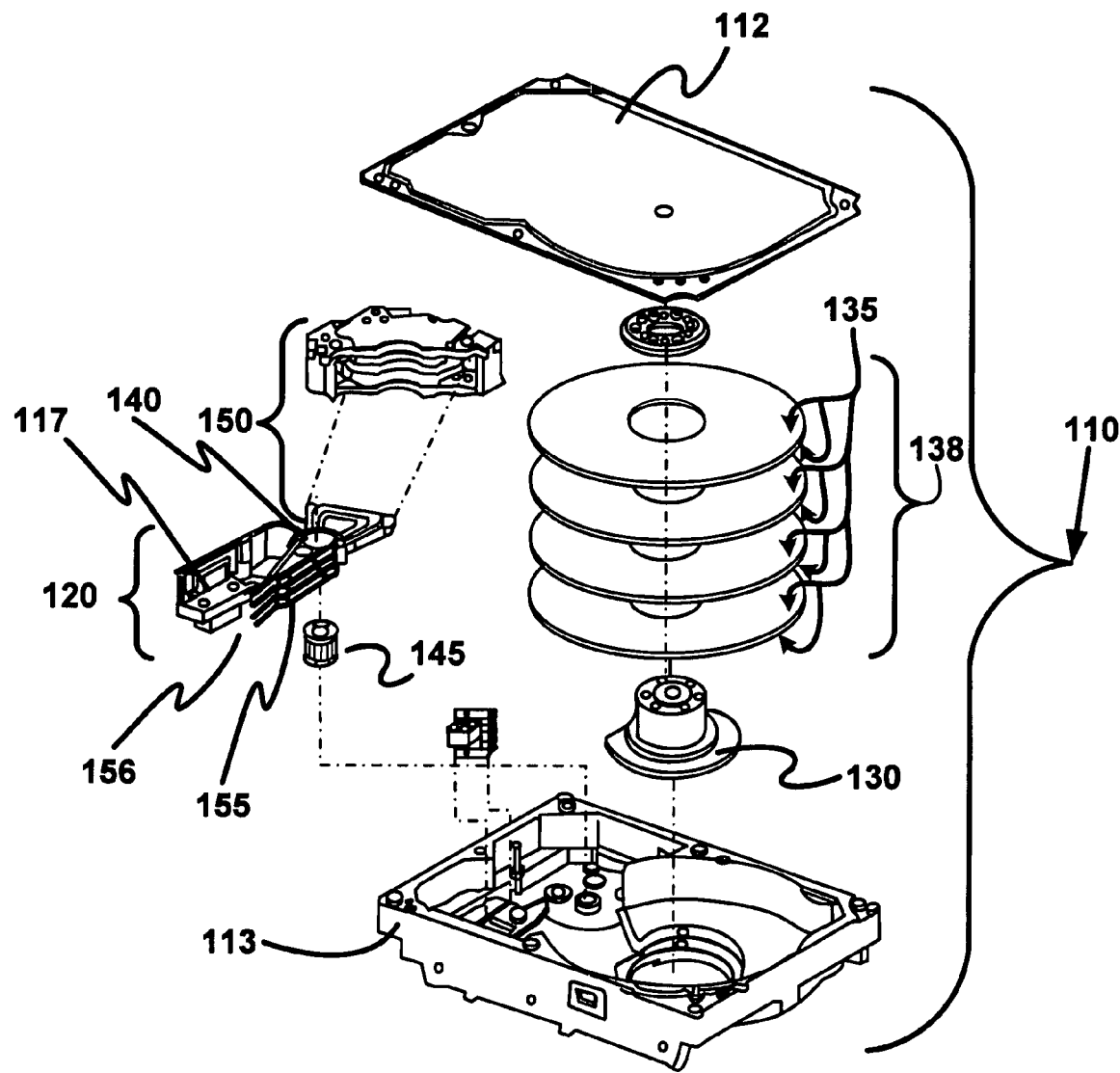
FIG. 1B is an isometric blow-apart of an HDD in accordance with one embodiment of the present invention.

FIG. 1B shows a similar HDD 110, but with all its components in an isometric blow-apart view. The components, such as the plurality of hard disks in a disk stack 138, are assembled into base casting 113, which provides coupling points for components and sub-assemblies such as disk stack 138, voice coil motor (VCM) 150, and actuator assembly 120. Disk stack 138 is coupled to base casting 113 by means of motor-hub assembly 130. Motor hub assembly 130 will have at least one disk 158 coupled to it whereby disk 158 can rotate about an axis common to motor-hub assembly 130 and the center of disk 158. Disk 158 has at least one surface 135 upon which reside data tracks 136. Actuator assembly 120 comprises in part connector 117, which conveys data between arm electronics and a host system wherein HDD 110 resides.

Actuator assembly 120 is coupled pivotally to base casting 113 by means of pivot bearing 145, whereby VCM 150 can move head 156 accurately across data tracks 136. Upon assembly of actuator assembly 120, disk stack 138, VCM 150, and other components with base casting 113, cover 112 is coupled to base casting 113 to enclose these components and sub-assemblies into HDD 110.

Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of the number of head-disk combinations.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to vibration relating to actuator 120.

Figure 2A:
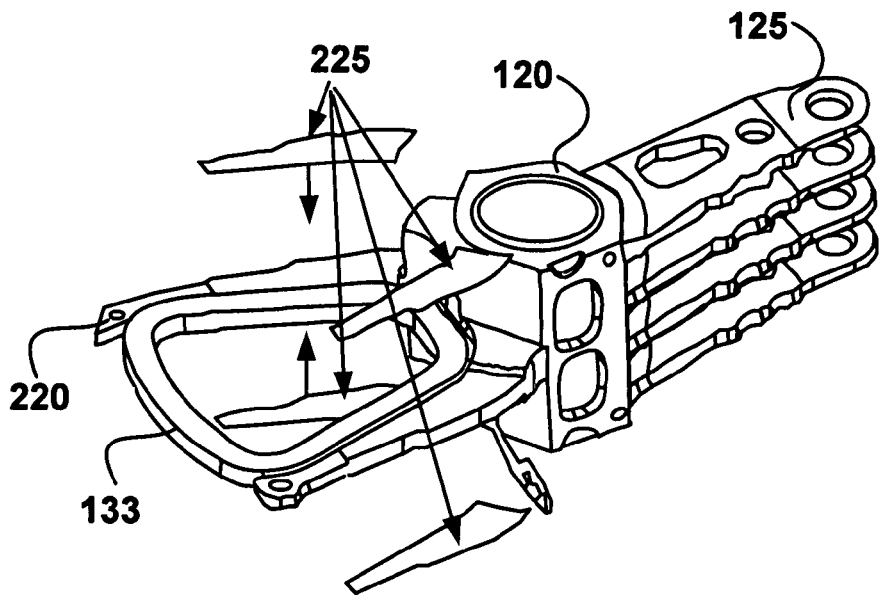
FIG. 2A is an isometric blow-apart view of the actuator coil with non-magnetic dampers in accordance with one embodiment of the present invention.

With reference now to FIG. 2A, an isometric blow-apart view of actuator 120 and a plurality of non-magnetic constrained layer dampers 225 is shown in accordance with one embodiment of the present invention. In general, actuator 120 includes an actuator voice coil 133 and voice coil yoke arms 220 as well as suspension arms 125. Although four non-magnetic constrained layer dampers 225 are shown as being associated with each side of voice coil yoke arms 220, the present technology is well suited to the utilization of only two non-magnetic constrained layer dampers 225 mounted in opposition across the two voice coil yoke arms 220. Moreover, the present technology may also be well suited to the utilization of only two non-magnetic constrained layer dampers 225 mounted both on the top sides or both on the bottom sides of the two voice coil yoke arms 220.

For example, a first non-magnetic constrained layer damper 225 may be mounted on a top side of one of the voice coil yoke arms 220 and then a second non-magnetic constrained layer damper 225 may be mounted on the bottom side of the other of the pair of voice coil yoke arms 220. In one embodiment, actuator 120 is manufactured in the usual manner with the only modification being the addition of non-magnetic constrained layer dampers 225 to the voice coil yoke arms 220.

Figure 2B:
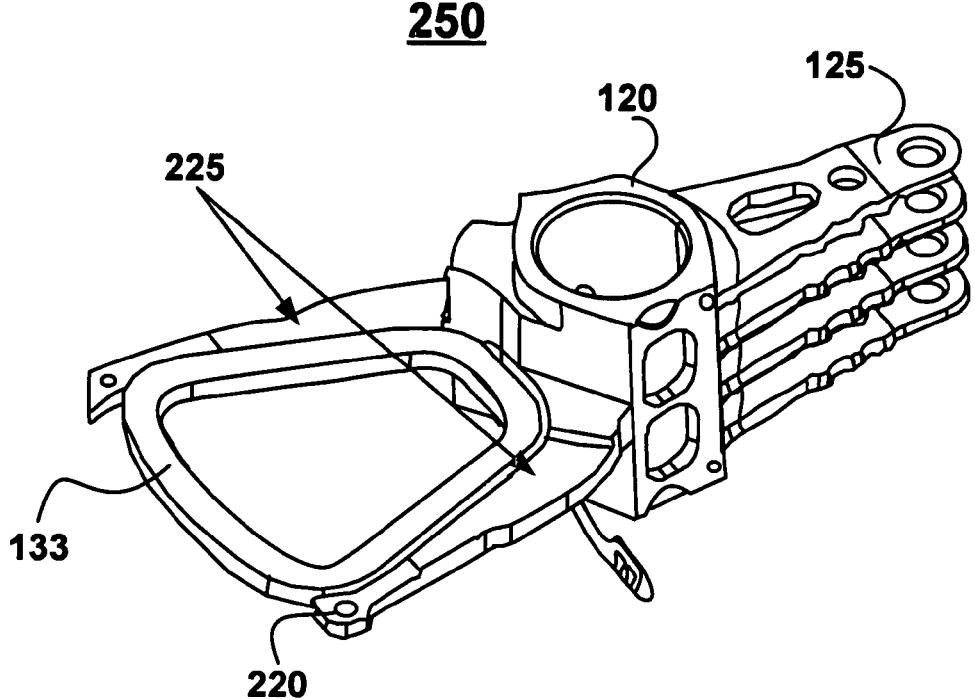
FIG. 2B is an isometric view of the actuator coil with non-magnetic dampers in place in accordance with one embodiment of the present invention.

Referring now to FIG. 2B, an isometric view of actuator 120 having a plurality of non-magnetic constrained layer dampers 225 mounted thereon is shown in accordance with one embodiment of the present invention. In general, actuator 120 includes an actuator voice coil 133 and voice coil yoke arms 220 as well as suspension arms 125.

Figure 3A:
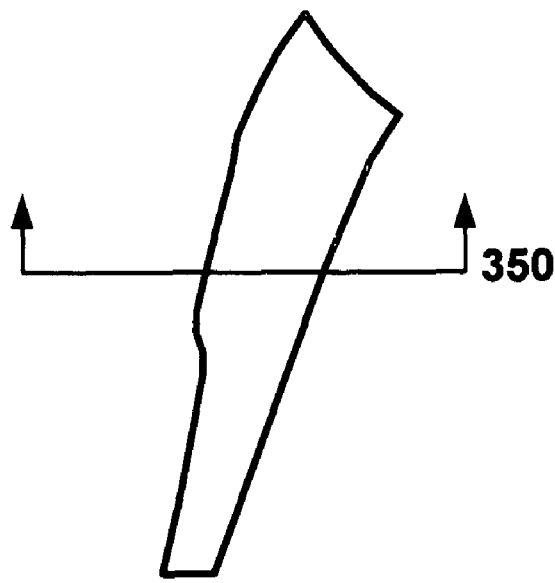
FIG. 3A is a plan view of the non-magnetic constrained layer damper in accordance with one embodiment of the present invention.

With reference now to FIG. 3A, a plan view of non-magnetic constrained layer damper 225 is shown in accordance with one embodiment of the present invention. In general, non-magnetic constrained layer damper 225 of FIG. 3 is shaped to form-fit the voice coil yoke arm 220 of FIG. 2B. In other words, the shape of non-magnetic constrained layer damper 225 follows the shape of the coil yoke arm 220 to maximize the damping effectiveness of non-magnetic constrained layer damper 225. In another embodiment, the shape of non-magnetic constrained layer damper 225 may be somewhat smaller than, but still follow the shape of, coil yoke arm 220 to account for dimensional tolerances or to accommodate manufacturing tooling requirements. In one other embodiment, the shape of non-magnetic constrained layer damper 225 may be of any shape, not necessarily following the shape of coil yoke arm 220.

Figure 3B:
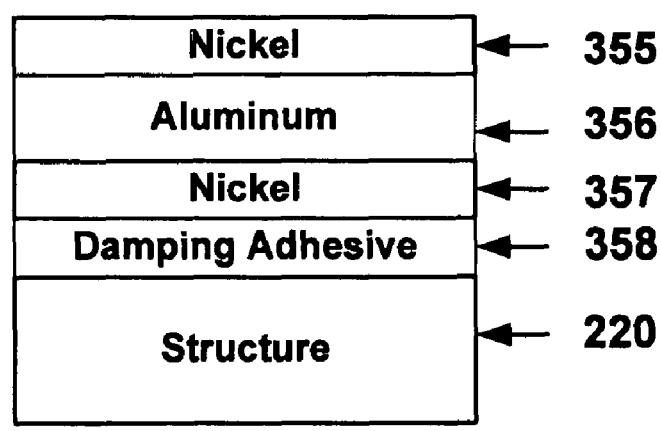
FIG. 3B is a block diagram of a cross section view of the non-magnetic constrained layer damper in accordance with one embodiment of the present invention.

Referring now to FIG. 3B, a block diagram of a cross section view of non-magnetic constrained layer damper 225 is shown in accordance with one embodiment of the present invention. In stack 350, non-magnetic constrained layer damper 225 as shown in stack 350 including a first layer of Nickel 355 a layer of aluminum 356 and a second layer of Nickel 357. In other words, in one embodiment, non-magnetic constrained layer damper 225 is a Nickel plated Aluminum damper utilizing a damping adhesive 358 to couple with voice coil yoke arm 220.

Although, stack 350 shows non-magnetic constrained layer damper 225 being formed of Nickel plated Aluminum, the present technology is well suited to alternate non-magnetic materials, composites, and the like. However, in one embodiment, there is no need to provide any elastic layer between the layers of non-magnetic constrained layer damper 225.

Referring now to FIG. 4, a flowchart of a method providing non-magnetic dampers on a voice coil yoke arm for reducing low frequency vibration in a hard disk drive is shown in accordance with one embodiment of the present invention. As described herein, the ability to provide utilizing a plurality of non-magnetic dampers on a voice coil yoke arm to reduce low frequency vibration allows a HDD to utilize tighter TPI without requiring significant tightening of the actuator tolerances. In so doing, significant manufacturing costs can be realized.

With reference now to 402 of FIG. 4 and to FIG. 2B, one embodiment receives actuator 120 including a coil region 150 having actuator voice coil 133 and a plurality of voice coil yoke arms 220 associated therewith. In addition, the actuator 120 includes a suspension 129 for reaching over the disk 138. In general, the suspension has a slider 155 coupled therewith; the slider 155 having a read/write head element 156 on a trailing edge (TE) portion.

Referring now to 404 of FIG. 4 and to FIG. 2B, one embodiment couples at least one of a plurality of non-magnetic constrained layer dampers 225 with each of the plurality of voice coil yoke arms 220 and not with actuator voice coil 133. That is, each voice coil yoke arm 220 will receive at least one non-magnetic constrained layer damper 225. For example, as described herein, a first non-magnetic constrained layer damper 225 may be mounted on a top side of one of the voice coil yoke arms 220 and then a second non-magnetic constrained layer damper 225 may be mounted on the bottom side of the other of the pair of voice coil yoke arms 220. Moreover, the present technology may also be well suited to the utilization of only two non-magnetic constrained layer dampers 225 mounted both on the top sides or both on the bottom sides of the two voice coil yoke arms 220.

However, in another embodiment, each side, e.g., top and bottom, of each voice coil yoke arm 220 will receive a non-magnetic constrained layer damper 225. For example, if there are two voice coil yoke arms 220, then there will be four non-magnetic constrained layer dampers 225. That is, a non-magnetic constrained layer damper 225 will be placed on a top surface of a first voice coil yoke arm 220 and a second non-magnetic constrained layer damper 225 will be placed on a bottom surface of the same voice coil yoke arm 220. A third and fourth non-magnetic constrained layer damper 225 will then be similarly placed on the second voice coil yoke arm 220.

By mounting the non-magnetic constrained layer dampers 225 on voice coil yoke arms 220, low frequency actuator coil torsion and coil bending resonances may be damped. By reducing the vibration of the actuator at low frequency, the TPI of the hard disk drive within which actuator 120 is utilized may be significantly reduced without detrimentally affecting the operation or reliability of the hard disk drive functionality.

As described herein at FIG. 3B, in one embodiment, the plurality of non-magnetic constrained layer dampers 225 are formed from a layer 356 of Aluminum between two layers of Nickel (355, 357) without providing an elastic layer between the three layers. In another embodiment, the plurality of non-magnetic constrained layer dampers 225 are formed from non-magnetic composite material. Furthermore, in one embodiment, the plurality of non-magnetic constrained layer dampers 225 are formed from non-magnetic composite material without providing an elastic layer within the non-magnetic composite material. In one embodiment, damping adhesive 358 is used to couple the plurality of non-magnetic constrained layer dampers 225 with the voice coil yoke arm 220.

Thus, embodiments of the present invention provide a method and apparatus providing non-magnetic dampers on a voice coil yoke arm for reducing low frequency vibration in a hard disk drive. Additionally, by utilizing the non-magnetic voice coil yoke arm dampers described herein, low frequency actuator coil torsion and coil bending resonances at seek/settle are significantly reduced. In addition, because the voice coil yoke arm dampers are non-magnetic, they will not adversely or detrimentally affect the VCM magnetic field. Moreover, this reduction in low frequency actuator coil torsion and coil bending resonances is realized with minimal modification to the overall HDD manufacturing process and to the actuator structure.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for utilizing a plurality of non-magnetic dampers on a voice coil yoke arm to reduce low frequency vibration in a hard disk drive, said method comprising:
  receiving an actuator comprising:
    a coil region having a voice coil and a plurality of voice coil yoke arms coupled with said voice coil; and
    a suspension for reaching over the disk, the suspension having a slider coupled therewith, said slider having a read/write head element on a trailing edge (TE) portion;
    forming a plurality of non-magnetic dampers from a layer of Aluminum plated on both sides with Nickel without providing an elastic layer between said layer of Aluminum and said two layers of plated Nickel; and
  coupling at least one of said plurality of non-magnetic dampers with each of said plurality of voice coil yoke arms and not with said voice coil, said plurality of non-magnetic dampers utilized for damping low frequency actuator coil torsion and coil bending resonances.

2. The method of claim 1 further comprising:
coupling at least one of said plurality of non-magnetic dampers with each side of each of said plurality of voice coil yoke arms.

3. The method of claim 1 further comprising:
forming each of said plurality of non-magnetic dampers to approximate the shape of said plurality of voice coil yoke arms.

4. The method of claim 1 further comprising:
forming said plurality of non-magnetic dampers from non-magnetic composite material.

5. The method of claim 1 further comprising:
forming said plurality of non-magnetic dampers from non-magnetic composite material without providing an elastic layer within said non-magnetic composite material.

6. The method of claim 1 further comprising:
utilizing a damping adhesive for coupling said plurality of non-magnetic dampers with said plurality of voice coil yoke arms.

7. A hard disk drive comprising:
  a housing;
  at least one disk coupled with the housing and rotatable relative to the housing, the disk defining an axis of rotation and a radial direction relative to the axis;
  an actuator coupled to said housing, said actuator having a coil region with a voice coil and a plurality of voice coil yoke arms; and
  a plurality of non-magnetic dampers coupled with said plurality of voice coil yoke arms and not with said voice coil, wherein one of said plurality of non-magnetic dampers is coupled with each side of each of said plurality of voice coil yoke arms and not with said voice coil, said plurality of non-magnetic dampers for damping low frequency actuator coil torsion and coil bending resonances wherein each of said plurality of non-magnetic dampers if formed from a layer of Aluminum plated on both sides with Nickel without providing an elastic layer between said layer of Aluminum and said two layers of plated Nickel.

8. The hard disk drive of claim 7 wherein each of said plurality of non-magnetic dampers if formed to approximate the shape of said plurality of voice coil yoke arms.

9. The hard disk drive of claim 7 wherein each of said plurality of non-magnetic dampers if formed from non-magnetic composite material.

10. The hard disk drive of claim 7 wherein each of said plurality of non-magnetic dampers if formed from non-magnetic composite material without providing an elastic layer within said non-magnetic composite material.

11. The hard disk drive of claim 7 wherein a damping adhesive is utilized for coupling said plurality of non-magnetic dampers with said plurality of voice coil yoke arms.

12. A plurality of non-magnetic dampers for a voice coil yoke arm comprising:
  a housing;
  a disk pack mounted to the housing and having a plurality of disks that are rotatable relative to the housing, the disk pack defining an axis of rotation and a radial direction relative to the axis;
  an actuator coupled to said housing, said actuator comprising:
    a coil region having a voice coil and a plurality of voice coil yoke arms coupled with said voice coil; and
    a suspension for reaching over the disk, the suspension having a slider coupled therewith, said slider having a read/write head element on a trailing edge (TE) portion; and
  a plurality of non-magnetic dampers coupled with said plurality of voice coil yoke arms and not with said voice coil, said plurality of non-magnetic dampers formed to approximate the shape of said plurality of voice coil yoke arms, wherein one of said plurality of non-magnetic dampers is coupled with each side of each of said plurality of voice coil yoke arms and not with said voice coil, said plurality of non-magnetic dampers for damping low frequency vibration of said actuator wherein each of said plurality of non-magnetic dampers if formed from a layer of Aluminum plated on both sides with Nickel without providing an elastic layer between said layer of Aluminum and said two layers of plated Nickel.

13. The plurality of non-magnetic dampers for a voice coil yoke arm of claim 12 wherein each of said plurality of non-magnetic dampers if formed from non-magnetic composite material.

14. The plurality of non-magnetic dampers for a voice coil yoke arm of claim 12 wherein each of said plurality of non-magnetic dampers if formed from non-magnetic composite material without providing an elastic layer within said non-magnetic composite material.

15. The plurality of non-magnetic dampers for a voice coil yoke arm of claim 12 wherein a damping adhesive is utilized for coupling said plurality of non-magnetic dampers with said plurality of voice coil yoke arms.

* * * * *